US008868333B2

(12) United States Patent
Bartels (10) Patent No.: US 8,868,333 B2
(45) Date of Patent: Oct. 21, 2014

(54) TECHNIQUE FOR CALCULATING A LOCATION OF A VEHICLE (75) Inventor: Florian Bartels, Nürnberg (DE)

(73) Assignee: Elektrobit Automotive GmbH, Erlangen (DE)

( * ) Notice: Subject to any disclaimer, the term of this patent is extended or adjusted under 35 U.S.C. 154(b) by 0 days.

(21) Appl. No.: 13/560,338

(22) Filed: Jul. 27, 2012

(65) Prior Publication Data
US 2013/0030697 A1 Jan. 31, 2013

(30) Foreign Application Priority Data

Jul. 27, 2011 (EP) .................................... 11006183

(51) Int. Cl.
G01C 21/30 (2006.01)
G01C 21/36 (2006.01)

(52) U.S. Cl.
CPC ............ G01C 21/30 (2013.01); G01C 21/3602 (2013.01); B60R 2300/302 (2013.01)
USPC ............................ 701/446; 701/448; 701/300

(58) Field of Classification Search
CPC .. B60R 2300/302; G01C 21/28; G01C 21/30; G01C 21/3602
USPC ........... 701/300–302, 445–448; 348/148, 149
See application file for complete search history.

(56) References Cited

U.S. PATENT DOCUMENTS

| 5,026,153 | A  | * | 6/1991  | Suzuki et al. ................ 356/3.16 |
| 6,023,653 | A  | * | 2/2000  | Ichimura et al. ............. 701/446 |
| 6,289,278 | B1 | * | 9/2001  | Endo et al. ................... 701/431 |
| 6,498,620 | B2 | * | 12/2002 | Schofield et al. ............. 348/148 |
| 7,233,864 | B2 | * | 6/2007  | Moser et al. .................. 701/472 |
| 7,561,955 | B2 | * | 7/2009  | Kubota ......................... 701/301 |
| 7,612,797 | B2 | * | 11/2009 | Nakamura et al. ............ 348/148 |
| 7,840,026 | B2 | * | 11/2010 | Nishiuchi ..................... 382/100 |
| 8,447,519 | B2 | * | 5/2013  | Basnayake et al. ........... 701/501 |

(Continued)

FOREIGN PATENT DOCUMENTS

| DE | 10 2004 010 197 A1 | 9/2005 |
| EP | 0 899 542 A1 | 3/1999 |
| EP | 0 939 297 A2 | 9/1999 |
| JP | 2007-094698 A | 4/2007 |

OTHER PUBLICATIONS

European Communication under Rule 71(3) EPC dated Mar. 14, 2013, issued in European Patent Application No. 11 006 183.5, (6 pages).

Primary Examiner — Helal A Algahaim
Assistant Examiner — Donald J Wallace
(74) Attorney, Agent, or Firm — Westerman, Hattori, Daniels & Adrian, LLP (57) ABSTRACT A technique for calculating a location of a first vehicle is described. A method implementation of this technique comprises the steps of detecting, from the perspective of the first vehicle, a movement of a second vehicle relative to the first vehicle, determining, for the time of the relative movement, a location of the second vehicle based on the detected relative movement by matching the detected movement of the second vehicle against map data, measuring, for the time of the relative movement, a distance between the first and second vehicles, and calculating the location of the first vehicle based on the measured distance and the determined location of the second vehicle. The technique also comprises an apparatus, a computer program product, and a vehicle navigation system.

19 Claims, 5 Drawing Sheets

(56) References Cited

U.S. PATENT DOCUMENTS

| | | | |
|---|---|---|---|
| 8,612,150 B2 * | 12/2013 | Heger et al. | 701/532 |
| 2002/0087269 A1 * | 7/2002 | Sasaki et al. | 701/301 |
| 2002/0183906 A1 * | 12/2002 | Ikeda | 701/36 |
| 2005/0209776 A1 | 9/2005 | Ogino | |
| 2009/0228204 A1 | 9/2009 | Zavoli et al. | |
| 2011/0087433 A1 * | 4/2011 | Yester | 701/301 |
| 2011/0109745 A1 * | 5/2011 | Nakatani et al. | 348/148 |

* cited by examiner

TECHNIQUE FOR CALCULATING A LOCATION OF A VEHICLE

TECHNICAL FIELD

The present disclosure relates to a technique for calculating a location of a vehicle. Specifically, a calculation technique that is based on map data is presented.

BACKGROUND

In the past, driver assistance systems have become widely available for large numbers of vehicles due to decreasing costs of such driver assist systems. One example of such driver assistance systems are vehicle navigation systems.

A vehicle navigation system possesses an inherent accuracy of position determination for the vehicle it is installed in. Due to usage of external positioning systems, such as the Global Positioning System (GPS), this accuracy is limited to the accuracy of the positioning system. In case of GPS, a positional error is in the order of 10 meters, which is usually accurate enough for highways or rural areas. However, in case of densely built areas, such as cities, turning points, such as roads, crossings and/or roundabouts, may have distances from one another in the order of 10 meters or even below. In such a case, an inherent accuracy of 10 meters may be insufficient.

Vehicle navigation systems or parts thereof (such as positioning components) may be in communication with Advanced Driver Assistance Systems (ADASs). An ADAS may, for example, be configured to change a shape of a vehicle spotlight at crossings, to change the direction of the vehicle spotlight on wiggly roads or to change the current gear selection. To perform such and other actions, the current vehicle position should be known with high accuracy. However, also ADASs inherently suffer from the positioning inaccuracy described above.

Figure 1:
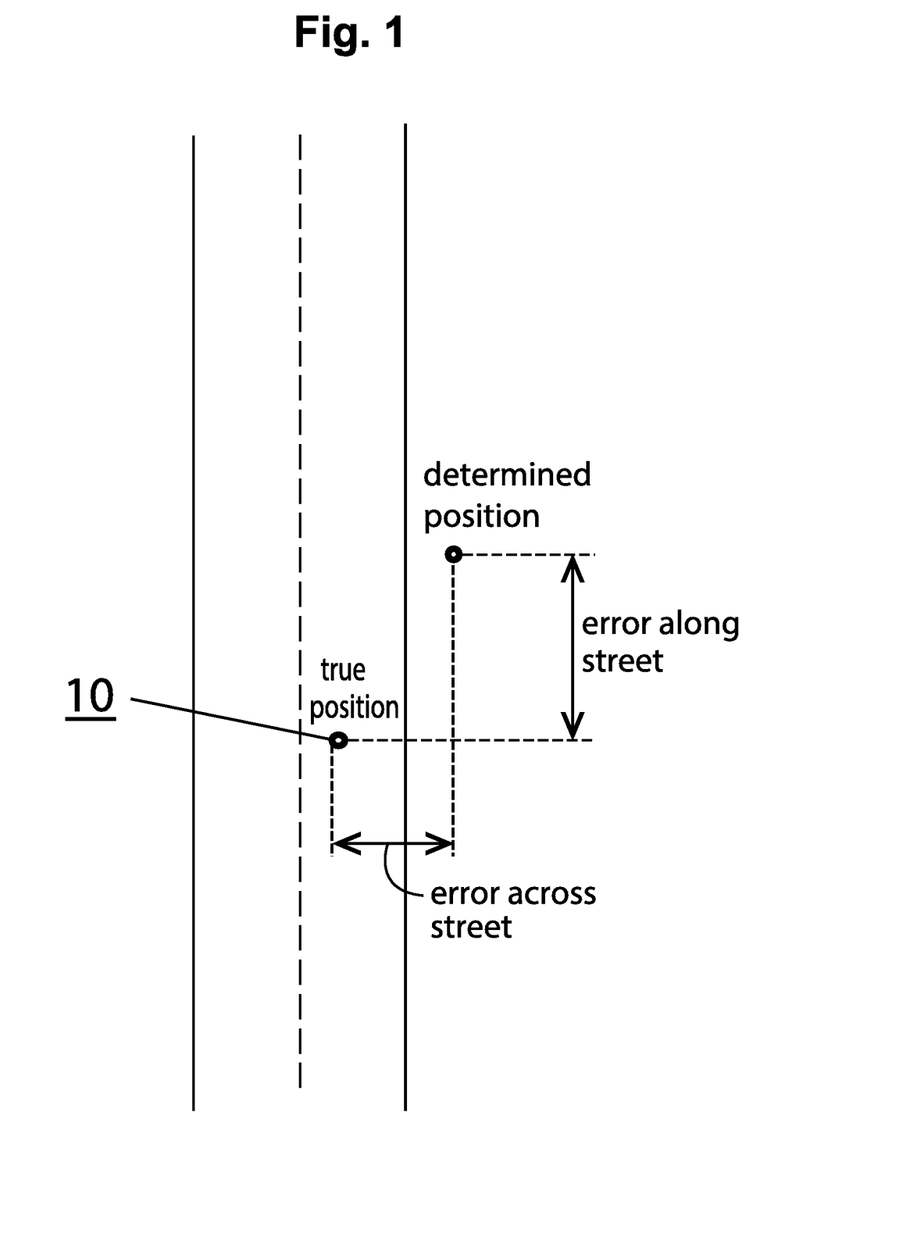
FIG. 1 shows a plan view of a vehicle travelling along a road and the positioning errors involved.

FIG. 1 shows a plan view of a vehicle 10 travelling along a road. As is shown in FIG. 1, there are basically two different types of error in relation to the true position of the vehicle on the road the vehicle is driving on.

Error Along the Street/Road:

Basically, this type of error covers an error caused by positioning systems (such as the GPS) in a direction substantially parallel to the longitudinal view axis of the vehicle (hence, of the driver). In other words, this type of error covers a fuzziness of the vehicle position in front of/behind the vehicle.

The error along the road can be compensated by using map data accessible to the vehicle navigation system or ADAS (e.g., after turning on a crossing or on a wiggly road).

Error Across the Street/Road:

This type of error basically covers an error caused by positioning systems in a direction substantially perpendicular to the longitudinal view axis of the vehicle (hence, of the driver), or a direction parallel to the vertical view axis of the vehicle. In other words, this type of error covers a fuzziness of the vehicle position left/right of the vehicle.

The error across the road can be reduced based on map data, since it can be reasonably assumed that the vehicle travels on the road and not in the range of fuzziness left/right of the road. Further, if taking into account the driving direction and the driving road side (e.g., right road side in countries such as Germany, or left road side in countries such as England), an assumption can be made on the side of the road the vehicle actually travels on, and hence the error across the road can be further reduced.

SUMMARY

For many applications the error along the road can be considered as the more important one. Aspects of the present disclosure aim at reducing the error along the road.

In a first aspect, a method for calculating a location of a first vehicle is provided, the method comprising the steps of detecting, from the perspective of the first vehicle, a movement of a second vehicle relative to the first vehicle; determining, for the time of the relative movement, a location of the second vehicle based on the detected relative movement by matching the detected movement of the second vehicle against map data; measuring, for the time of the relative movement, a distance between the first and second vehicles; and calculating the location of the first vehicle based on the measured distance and the determined location of the second vehicle. The determination of the location of the first vehicle may thus exploit a short-lived peak in positioning precision of the second vehicle, e.g., when the second vehicle turns or moves otherwise. In this instance, the error along the road of the second vehicle typically becomes minimal, and the peak precision of the second vehicle may thus be exploited to "boost" the positioning precision of the first vehicle.

At least one of the determining step and the calculating step may be supplemented by sensor data indicative of an absolute position of the first vehicle. As mentioned above, the usage of sensor data in the first vehicle may contribute to further enhance the positioning precision of the first vehicle. For example, the sensor data may be satellite data such as GPS data, and thus the determining and/or calculating may be supplemented with the satellite-assisted derivation of the position of the first vehicle.

The calculating step may further comprise matching an assumed location of the first vehicle against map data, the assumption being based on the measured distance and the determined location of the second vehicle, so as to obtain the calculated location of the first vehicle. This mapping may, for example, serve as a plausibility test for confirming the positioning result obtained. For example, if the calculated position of the first vehicle is impossible according to the map data (e.g., the position calculated is next to a road or on a road different from the road currently traveled on), such a result may indicate an error in the distance measurement.

The relative movement may be a rotation of the second vehicle. The rotation of the second vehicle may be detected based on a relative movement of one of the braking lights and front lights of the second vehicle. Alternatively or in addition, the rotation of the second vehicle may be detected based on a visibility change of a side door of the second vehicle (e.g., the side door transiting from occlusion to visibility from the perspective of the first vehicle or the side door transiting from visibility to occlusion from the perspective of the first vehicle).

Rotation of the second vehicle can be reasonably assumed as an indication of the second vehicle entering a curve (turning in a curve is the instance of peak precision, i.e., the position of the second vehicle can be equated with the position of the curve). Such rotation may be detected by image recognition, e.g., if the braking lights (when the second vehicle is in front of the first vehicle) suddenly change their relative lateral position (e.g., compared to recent relative lateral positions of the braking lights). If the second vehicle is behind the first vehicle, the front lights of the second vehicles may take the role of the braking lights. Alternatively, the image recognition may also store a rough picture (or a vector of expected features) of a side door of a vehicle. When the second vehicle travels in front of the first vehicle, the side door will become visible upon turning, and hence the first vehicle may determine this instance as the time of turning. If the second vehicle is behind the first vehicle, the side door becoming invisible may fulfil the same function.

Further, the relative movement of the second vehicle may also be a rotation in the sense of a yaw rotation. This does not exclude that also a pitch rotation of the second vehicle may be used as relative movement. For example, when approaching a hill or a similar ascending or descending slope, the second vehicle performs a pitch movement. In this instance, the location of the second vehicle may coincide with the location of the ascending or descending slope, and, provided that the location of the ascending or descending slope is included in the map material, the relative movement may be detected. For example, ascending or descending slopes are included in modern navigation systems involving not only the shortest or fastest route, but also the most economical route (e.g., in terms of fuel consumption).

As an alternative or an addition to the above rotation approach, the relative movement may a displacement of the second vehicle perpendicular to the longitudinal view axis of the first vehicle. If so, the displacement may be one of a leftward, rightward, upward and downward displacement of the second vehicle with respect to a driving direction axis of the first vehicle. As a more simple approach, the second vehicle turning may also be assumed if the second vehicle fully or at least partially "vanishes" out of the direct line of sight of the first vehicle.

As described above, such a "vanishing" out of the direct line of sight may happen to the left or the right, but also in an upward or downward direction. As for the leftward or rightward displacement, it is noted that not only curves may be involved, but also the second vehicle vanishing behind a house or a similar point of interest on the road whose position is lodged in the map material. Still further, such "vanishing" may also occur in the downward direction (e.g., if the second vehicle has passed the angular point of a hill.

If the road traveled on has several lanes, the displacement may happen to the left or the right. In addition, this displacement approach may aid to the detection (e.g., when the rotation is too weak to securely detect a turning; such a case may occur if the curve is comparatively long, and thus the side door becomes hardly visible/invisible or the braking/front lights change their lateral positions only slowly). The displacement approach can also aid the turning detection, for example in case of a motorway exit: as soon as the second vehicle changes from the right lane to the exit lane (most drivers will do this at the very beginning of the exit lane), the same peak precision as in an ordinary curve occurs, and hence the turning can be detected and exploited in the above-described manner.

In addition to the above rotation and/or displacement approaches, it could be envisaged to detect the second vehicle's indicator lights to start or end blinking (to the left or right). As soon as the blinking start or end is detected, the subsequent relative movement detection could be "alerted" in a way that turning is detected even if there is only a slight displacement, a slight change in lateral front/braking light position or an insecure detection of the side door visibility transition, since it can be reasonably assumed that the indicator lights blinking indicates an imminent turning operation. In this way, the relative movement of the second vehicle could be detected more securely and/or in more occasions.

As an alternative or an addition to the indicator light approach, activation of the braking lights (not to be mistaken with the relative movement of the braking lights) may be detected in order to "alert" the subsequent relative movement detection in the above-described fashion. This approach is feasible because it can be reasonably assumed that the second vehicle will decelerate (e.g., prior to entering a sharp curve). More generally speaking, the second vehicle decelerating (i.e., braking and thus activating the braking lights) may be considered as an indication of an arbitrary anomaly in the road course: not only sharp curves may be preceded by a braking operation, but also a descending slope (in that case, the second vehicle may decelerate in order not to violate a speed limit), a construction site (whose position may be known, e.g., from a traffic surveillance system) or similar deviations from the straight road. In addition, the braking light activation approach may further be enhanced by incorporating comparing a measured speed of the second vehicle to an allowed maximum speed: the second vehicle travelling slower than the allowed maximum speed may also serve as an indication of the above anomaly in the road course.

In a second aspect, a computer program product is provided, the computer program product comprising program code portions for performing any of the method aspects disclosed herein when the computer program product is executed on one or more computing devices (e.g., on the vehicle navigation system or an ADAS). The computer program product may be stored on a computer readable recording medium.

In a third aspect, an apparatus for calculating a location of a first vehicle is provided, the apparatus comprising at least one processor; a measuring component operably connected to the at least one processor, and configured to measure a distance between the first vehicle and a second vehicle; and a detecting component operably connected to the at least one processor, and configured to detect, from the perspective of the first vehicle, a movement of the second vehicle relative to the first vehicle; wherein the at least one processor is configured to determine, for the time of the relative movement, a location of the second vehicle based on the detected relative movement by matching the detected movement of the second vehicle against map data; measure, for the time of the relative movement, the distance between the first and second vehicles; and calculate the location of the first vehicle based on the measured distance and the determined location of the second vehicle.

According to the above third aspect, the apparatus may further comprise a positioning sensor (for example, a GPS sensor) configured to determine the position of the first vehicle, and to supplement the at least one processor in the operations of determining and calculating. Further, the at least one processor may be configured to match the calculated location of the first vehicle against map data.

Still further, the measuring component may be constituted by one of a radar device a camera device, and/or an electronic rear mirror. Many so-called high-end vehicles have a built-in camera or radar to detect vehicles driving in their front, and their positions in relation to the own vehicle (i.e., the distance between the current vehicle and the vehicle in the front). Accordingly, the present technique can be implemented using existing equipment to the highest extent possible or, in other words, requiring the least amount of additional equipment or new installations possible.

In a fourth aspect, a vehicle navigation system or an ADAS is provided, which comprises an apparatus according to the above first or second aspects.

It is to be noted that the apparatus (and the vehicle navigation system/ADAS) may implement any of the technical details set forth for the method aspect herein, and thus achieves the same advantages. In other words, the apparatus may comprise further components adapted to perform any of the method steps disclosed herein.

BRIEF DESCRIPTION OF THE DRAWINGS

The embodiments of the technique presented herein are described below with reference to the accompanying drawings, in which.

DETAILED DESCRIPTION

In the following description, for purposes of explanation and not limitation, specific details are set forth (such as particular processing steps) in order to provide a thorough understanding of the technique presented herein. It will be apparent to one skilled in the art that the present technique may be practised in other embodiments that depart from these specific details. For example, while the embodiments will primarily be described in the context of vehicle navigation system, this does not rule out the implementation in an ADAS.

Moreover, those skilled in the art will appreciate that the services, functions and steps explained herein below may be implemented using software functioning in conjunction with a programmed microprocessor, or using an Application Specific Integrated Circuit (ASIC), a Digital Signal Processor (DSP) or general purpose computer. It will also be appreciated that while the following embodiments are described in the context of methods and devices, the technique presented herein may also be embodied in a computer program product as well as in a system comprising a computer processor and a memory coupled to the processor, wherein the memory is encoded with one or more programs that execute the services, functions and steps disclosed herein.

Figure 2:
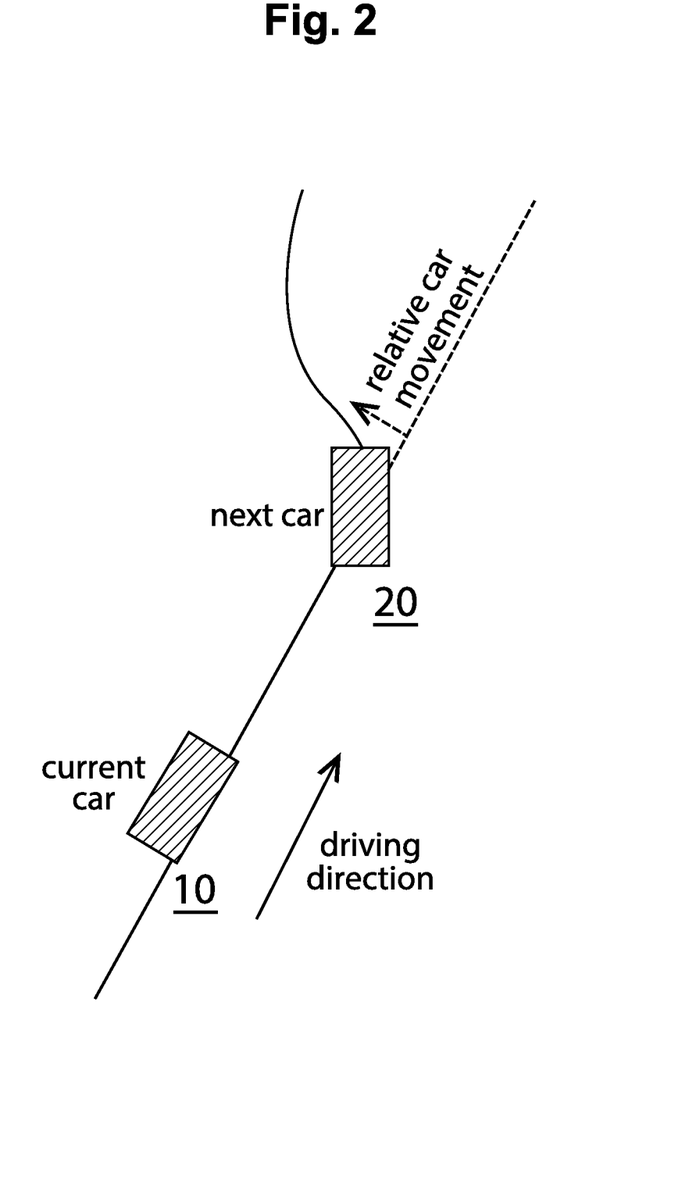
FIG. 2 shows a basic concept of an embodiment applied in a typical use case.

FIG. 2 shows a basic concept of an embodiment applied in a typical use case. A first vehicle 10 (also referred to as "current car/vehicle") is equipped to detect when a second vehicle 20 (also referred to as "next car/vehicle") in the front of (or behind, not shown in FIG. 2) the first vehicle 10 turns or drives in a curve. In this way, the current vehicle 10 can detect a crossing or curvy parts of a road in advance, i.e., before entering it (in the instance of turning, the location of the second vehicle 20 can be equated with the location of the crossing/curvy part). The first vehicle is further equipped to measure the distance towards the second vehicle 20.

As shown in FIG. 2, the first vehicle 10 travels, along a driving direction, behind the second vehicle 20. The second vehicle 20 is depicted to be in the middle of a rotation due to the road having a curve on which the second vehicle 20 currently travels. Due to the rotation, a relative movement of the second vehicle 20 occurs in this instance from the perspective of the first vehicle 10, which drives on a straight road portion.

As shown in FIG. 2, the current vehicle 10 observes the vehicle in front of it (i.e., next vehicle 20). The relative movement of the next vehicle 20 is determined by detecting a rotation of that vehicle (e.g., based on a relative movement of braking lights or a side door becoming visible) or the relative displacement (next vehicle moves left relative to the driving direction of the current vehicle).

As soon as a rotation or movement of the second vehicle 20 has been detected, that relative movement is matched to the map data. As mentioned above, in the instance of turning, it can be reasonably expected that the location of the second vehicle 20 and the location of the curve coincide; hence, the location of curve (or crossing, roundabout or similar "exceptions" from the straight road) which is known from the map data is the "peak-precision location". Consequently, if the current road (or a possible successive road) allows the detected rotation or movement, the position of the next vehicle 20 can be matched to the map data with a high accuracy. As the distance of the current vehicle 10 to the next vehicle 20 can be determined with a high accuracy as well, the position of the current vehicle on the map data can be determined with a high accuracy.

Figure 3A:
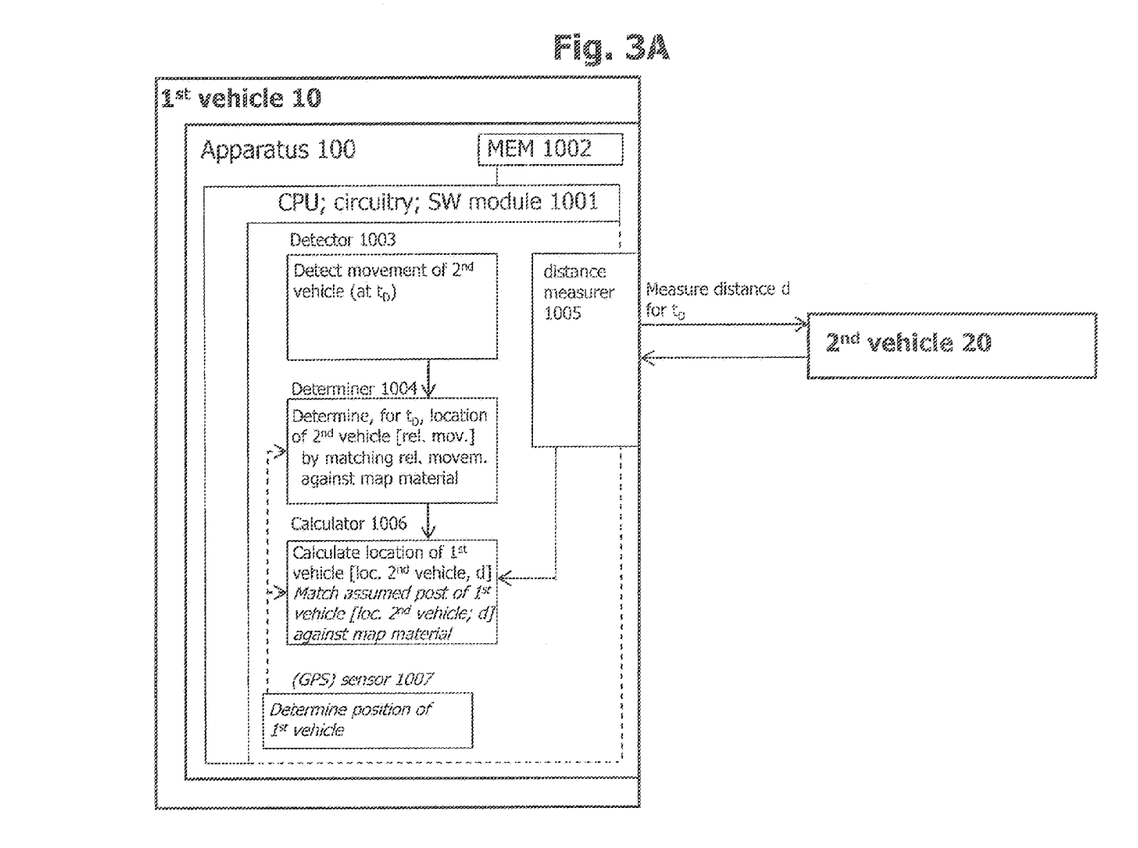
FIG. 3A shows the components comprised in an embodiment of an apparatus, and the interaction between the components of the apparatus
Figure 3B:
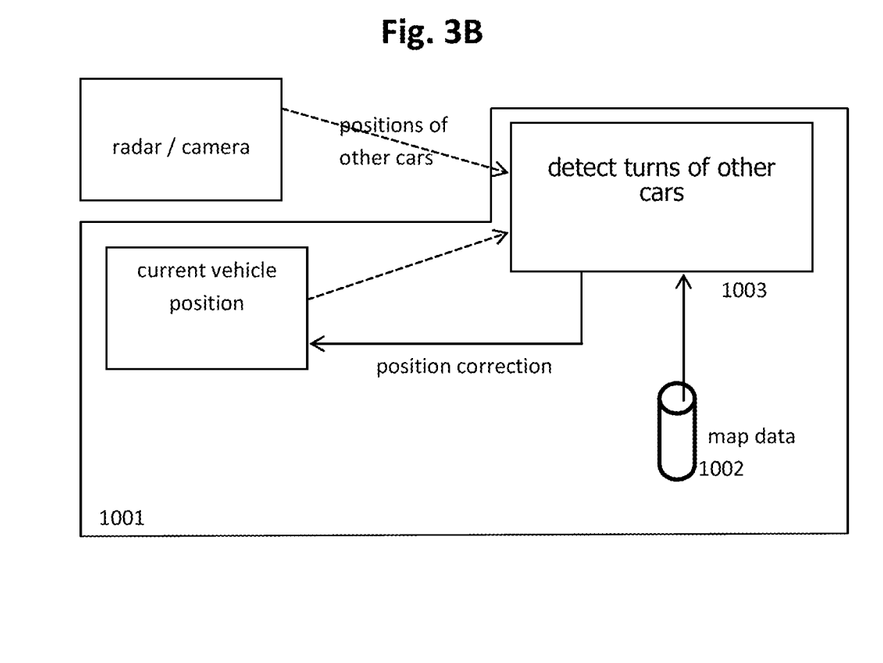
FIG. 3B shows an exemplary implementation of the apparatus.

FIGS. 3A and 3B show an embodiment of an apparatus 100 (situated, for example, in the first vehicle 10) for calculating the location of the first vehicle 10. FIG. 3A shows the components comprised in the apparatus, and the interaction between the components of the apparatus, while FIG. 3B shows a special implementation of the apparatus.

As shown in FIG. 3A and partially in FIG. 3B, the first vehicle 10 comprises the apparatus 100, which in turn comprises a core functionality (e.g., a central processing unit (CPU), a dedicated circuitry or a software module) 1001, a memory (and/or database) 1002, a detector 1003, a determiner 1004, a distance measurer 1005, a calculator 1006 and an optional sensor 1007 (which is, for example, a GPS sensor). As is shown in FIG. 3B, the distance measurer 1005 may take the form of one of a camera and a radar, and the database 1002 may store map data or map data. The database 1002 may also be located off-board the vehicle 10 and may be coupled to the apparatus 100 via a wireless communication link.

As indicated by the dashed extensions of the functional block of the CPU 1001, the detector 1003, the determiner 1004, the distance measurer 1005, the calculator 1006 and the sensor 1007 may at least partially be functionalities running on the CPU 1001, or may alternatively be separate functional entities or means controlled by the CPU 1001 and supplying the same with information.

The CPU 1001 may be configured (e.g., by software residing in the memory 1002) to process various data inputs and to control the functions of the memory 1002, the detector 1003, the determiner 1004, the distance measurer 1005, the calculator 1006 and the sensor 1007. The memory 1002 may serve for storing code means for carrying out the methods according to the aspects disclosed herein, when run on the CPU 1001.

Figure 4:
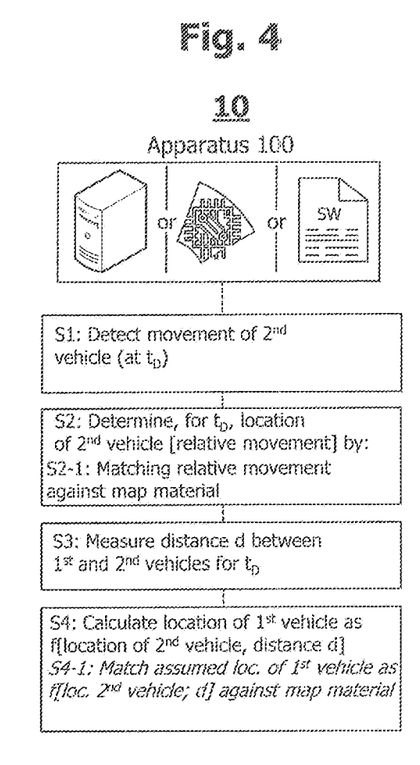
FIG. 4 shows a method embodiment for calculating the location of a vehicle.

FIG. 4 illustrates an embodiment of a method for calculating the location of the first vehicle 10. In the signaling diagram of FIG. 4, time aspects between steps are reflected in the vertical arrangement of the signaling sequence as well as in the sequence numbers. It is to be noted that the time aspects indicated in FIG. 4 do not necessarily restrict any one of the method steps shown to the step sequence outlined in FIG. 4. This applies in particular to method steps that are functionally disjunctive with each other; for example, as soon as the relative movement of the second vehicle is detected in step S1, the determining step S2 and the distance measuring step S3 can be carried out in the sequence shown, in the reversed sequence or substantially simultaneously.

Referring still to the signaling diagram of FIG. 4 (to be read along with the apparatus 100 shown in FIGS. 3A and 3B), in step S1, the detector 1003 of the apparatus 100 detects, from the perspective of the first vehicle 10, a relative movement of the second vehicle 20 relative to the first vehicle 10.

The relative movement may be a rotation (e.g., in a curve or at a crossing) of the second vehicle. In this case, the rotation of the second vehicle may be detected based on a relative movement of one of the braking lights and front lights of the second vehicle. Alternatively or additionally, the rotation of the second vehicle may be detected based on one of a side door of the first vehicle transiting from occlusion to visibility from the perspective of the first vehicle and the side door transiting from visibility to occlusion from the perspective of the first vehicle. The rotation approach only needs basic image recognition involving little or no feature extraction and analysis (e.g., "little" feature processing in case of side door recognition, and "no" feature processing in case of braking/front light recognition), and moderate image processing complexity (e.g. certain parts of a past image, such as lights or side door, are stored and matched against a current image).

Alternatively, the relative movement may a displacement of the second vehicle perpendicular to the longitudinal view axis of the first vehicle (e.g., at a motorway exit). In this case, the displacement may be a one of a leftward and rightward displacement of the second vehicle with respect to a driving direction of the first vehicle. The displacement approach requires only an even simpler image recognition involving no feature extraction (a stored basic image of a vehicle may be matched against a current image) and low or lowest image processing complexity (low if using a basic vehicle image; or lowest if only measuring pixel-by-pixel differences between past images and the current image. In the latter case, it may be assumed that simple thresholding can distinguish a vehicle vanishing—average pixel change is high—from a vehicle only moving slightly—average pixel change is low).

Further, it is to be noted that the displacement approach also allows for implementation via radar involving no image recognition; in the simplest case, e.g. a current radar measurement and at least one past radar measurement could provide a simple yes/no detection of presence of a second vehicle. A measurement sequence such as " . . . yes-yes-no-no- . . . ", at the first time of detecting no presence of the second vehicle, may suffice as detection of the relative movement.

Then, in step S2, the determiner 1004 of the apparatus 100 determines, for the time of the relative movement, a location of the second vehicle based on the detected relative movement. Detection in step S2 is augmented, in step S2-1, by map data from memory 1002. Specifically, the detected movement of the second vehicle 20 is matched against map data. Optionally, the determiner 1004 may further be augmented by the sensor 1007 (e.g., a GPS sensor) supplying sensor data indicative of an absolute the position of the first vehicle. As mentioned above, the sensor data may include an inherent inaccuracy in the order of 10 meters.

In the instance of turning, it can be reasonably expected that the location of the second vehicle 20 and the location of the curve coincide. Hence, the location of the detected relative movement (which coincides with curve, crossing, roundabout or similar "exceptions" from the straight road) is matched to the map data. Since the location of the curve, crossing, roundabout etc. is exactly known from the map data, the above-described "peak-precision location" can be derived for the time of the relative movement. The sensor data may be redundantly consulted to coarsely verify the vehicle position detected by the matching process (note that the sensor data relate to the position of the first vehicle 10 and not to the position of the second vehicle 20).

In this context, it is to be noted that the term "time of relative movement" may be any point in time beginning at the very start of the second vehicle moving relatively (rotating or displacing) and ending at the very end of the second vehicle moving relatively. As a further enhancement, detection of the relative movement may occur if the second vehicle assumes (at least) half a turn angle of a curve (seen from the longitudinal view axis of the first vehicle). For instance, in the likely case of a 90° curve, relative movement detection may be decided if the second vehicle assumes a turn angle of 45°.

Before, after or concurrently to step S2, in step S3, the distance measurer 1005 of the apparatus 100 measures, for the time of the relative movement, a distance between the first and second vehicles 10, 20. Such a distance measurement can be effected, for example, by radar, ultrasonic rays, or image recognition. Especially ultrasonic distance warning equipment is quite common for state-of-the-art vehicles, and can be easily used as a distance measurer in the sense of the technique presented herein.

Finally, in step S4, the calculator 1006 of the apparatus 100 calculates the location of the first vehicle 10 based on the measured distance and the determined location of the second vehicle 20. Optionally, the calculator 1006 may further be augmented by the sensor 1007 (e.g. a GPS sensor) supplying the above-described sensor data. As another option, in an optional step S4-1, the calculator 1006 may further be augmented by memory 1002 to match an assumed location of the first vehicle against map data, the assumption being based on the measured distance and the determined location of the second vehicle, so as to obtain the calculated location of the first vehicle. Both the sensor data and the matching may constitute a plausibility test for the calculated position. Alternatively, or in addition, the sensor data may be calibrated based on the location of the first vehicle as calculated by the calculator 1006. In this way, the inherent inaccuracy of such sensor data can be reduced. The calibration may remain valid until a re-calibration occurs in the context of newly performing the process illustrated in FIG. 4 at a later point in time.

The location of the first vehicle 10, which is now known with a very high precision, may be exploited by a vehicle navigation system, an ADAS or any other vehicle-based or remote system.

As has become apparent from the embodiments described hereinabove, the technique presented herein brings about the several advantages. Generally, the error along a road can be reduced using, for example, a camera, radar or electronic rear mirror many high-end vehicles have built-in. According to the above embodiments, the positioning of the first vehicle may take advantage of a short-lived peak in positioning precision of the second vehicle, for example when the second vehicle turns. In this instance, the error along the road of the second vehicle becomes minimal; when taking the thus determined position of the first vehicle in conjunction with the distance between first and second vehicle measured for this instance, the positioning can exploit the peak precision of the second vehicle for "boosting" the positioning precision of the first vehicle as well.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects.

Because the technique presented herein can be varied in many ways, it will be recognized that the invention should be limited only by the scope of the claims that follow.

The invention claimed is:

1. A method for calculating a location of a first vehicle, comprising:
    detecting, from the perspective of the first vehicle, a movement of a second vehicle relative to the first vehicle;
    determining, for the time of the relative movement, a location of the second vehicle based on the detected relative movement by matching the detected movement of the second vehicle against map data;
    measuring, for the time of the relative movement, a distance between the first and second vehicles; and
    calculating the location of the first vehicle based on the measured distance and the determined location of the second vehicle,
    wherein the relative movement is a rotation of the second vehicle.

2. The method according to claim 1, wherein at least one of the determining step and the calculating step is supplemented by sensor data indicative of an absolute position of the first vehicle.

3. The method according to claim 1, wherein the calculating step further comprises:
    matching an assumed location of the first vehicle against map data, the assumption being based on the measured distance and the determined location of the second vehicle, so as to obtain the calculated location of the first vehicle.

4. The method according to claim 1,
    wherein the rotation of the second vehicle is detected based on a relative movement of one of the braking lights and front lights of the second vehicle.

5. The method according to claim 1,
    wherein the rotation of the second vehicle is detected based on a visibility change of a side door of the second vehicle.

6. The method according to claim 1,
    wherein the relative movement is a displacement of the second vehicle perpendicular to the longitudinal view axis of the first vehicle.

7. The method according to claim 6,
    wherein the displacement is a one of a leftward, rightward, downward and upward displacement of the second vehicle with respect to a driving direction axis of the first vehicle.

8. A computer program product comprising program code portions for performing the method of claim 1, when the computer program product is executed on one or more computing devices.

9. The computer program product according to claim 8, stored on a non-transitory computer readable recording medium.

10. An apparatus for calculating a location of a first vehicle, the apparatus comprising:
    at least one processor;
    a measurer operably connected to the at least one processor, and configured to measure a distance between the first vehicle and a second vehicle; and
    a detector operably connected to the at least one processor, and configured to detect, from the perspective of the first vehicle, a movement of the second vehicle relative to the first vehicle;
    wherein the at least one processor is configured to:
    determine, for the time of the relative movement, a location of the second vehicle based on the detected relative movement by matching the detected movement of the second vehicle against map data;
    measure, for the time of the relative movement, the distance between the first and second vehicles; and
    calculate the location of the first vehicle based on the measured distance and the determined location of the second vehicle,
    wherein the relative movement is a rotation of the second vehicle.

11. The apparatus according to claim 10, further comprising:
    a positioning sensor,
    wherein the positioning sensor is configured to:
    determine the position of the first vehicle, and
    supplement the at least one processor in the operations of determining and calculating.

12. The apparatus according to claim 10, wherein the at least one processor is further configured to match the calculated location of the first vehicle against map data.

13. The apparatus according to claim 10,
    wherein the measurer comprises one of a radar device and a camera device.

14. A vehicle navigation system comprising an apparatus according to claim 10.

15. An Advanced Driver Assist System comprising an apparatus according to claim 10.

16. An apparatus for calculating a location of a first vehicle, the apparatus comprising:
    means for processing;
    means for measuring, operably connected to the means for processing, a distance between the first vehicle and a second vehicle; and
    means for detecting, operably connected to the means for processing, from the perspective of the first vehicle, a movement of the second vehicle relative to the first vehicle;
    wherein the means for processing is for
    determining, for the time of the relative movement, a location of the second vehicle based on the detected relative movement by matching the detected movement of the second vehicle against map data;
    measuring, for the time of the relative movement, the distance between the first and second vehicles; and
    calculating the location of the first vehicle based on the measured distance and the determined location of the second vehicle,
    wherein the relative movement is a rotation of the second vehicle.

17. A method for calculating a location of a first vehicle, comprising:
    detecting, from the perspective of the first vehicle, a movement of a second vehicle relative to the first vehicle;
    determining, for the time of the relative movement, a location of the second vehicle based on the detected relative movement by matching the detected movement of the second vehicle against map data;
    measuring, for the time of the relative movement, a distance between the first and second vehicles; and
    calculating the location of the first vehicle based on the measured distance and the determined location of the second vehicle,
    wherein the relative movement is a displacement of the second vehicle perpendicular to the longitudinal view axis of the first vehicle.

18. An apparatus for calculating a location of a first vehicle, the apparatus comprising:

at least one processor;

a measurer operably connected to the at least one processor, and configured to measure a distance between the first vehicle and a second vehicle; and a detector operably connected to the at least one processor, and configured to detect, from the perspective of the first vehicle, a movement of the second vehicle relative to the first vehicle;

wherein the at least one processor is configured to:

determine, for the time of the relative movement, a location of the second vehicle based on the detected relative movement by matching the detected movement of the second vehicle against map data;

measure, for the time of the relative movement, the distance between the first and second vehicles; and calculate the location of the first vehicle based on the measured distance and the determined location of the second vehicle, wherein the relative movement is a displacement of the second vehicle perpendicular to the longitudinal view axis of the first vehicle.

19. An apparatus for calculating a location of a first vehicle, the apparatus comprising:

means for processing;

means for measuring, operably connected to the means for processing, a distance between the first vehicle and a second vehicle; and means for detecting, operably connected to the means for processing, from the perspective of the first vehicle, a movement of the second vehicle relative to the first vehicle;

wherein the means for processing is for determining, for the time of the relative movement, a location of the second vehicle based on the detected relative movement by matching the detected movement of the second vehicle against map data;

measuring, for the time of the relative movement, the distance between the first and second vehicles; and calculating the location of the first vehicle based on the measured distance and the determined location of the second vehicle, wherein the relative movement is a displacement of the second vehicle perpendicular to the longitudinal view axis of the first vehicle.

* * * * *